United States Patent Office 3,671,101
Patented June 20, 1972

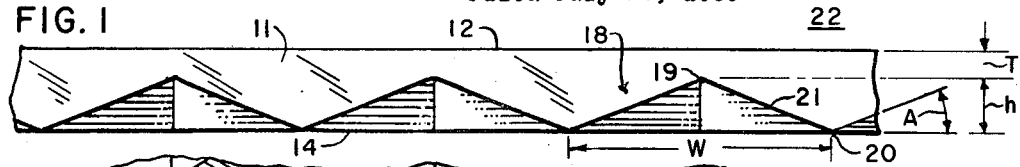
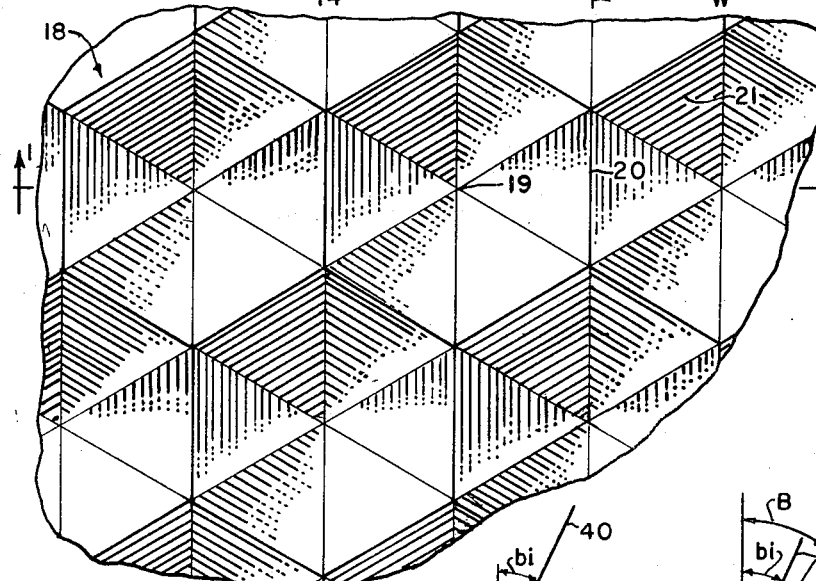
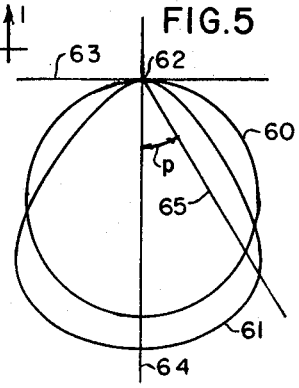
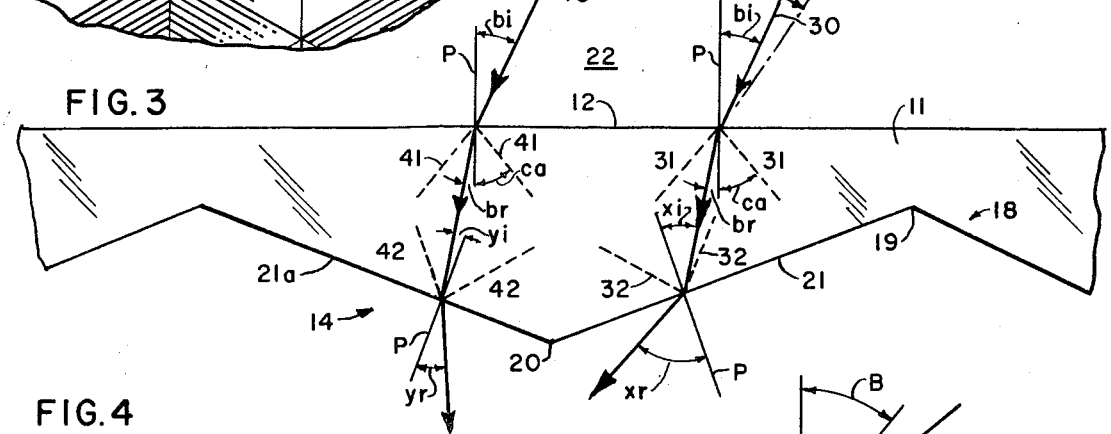
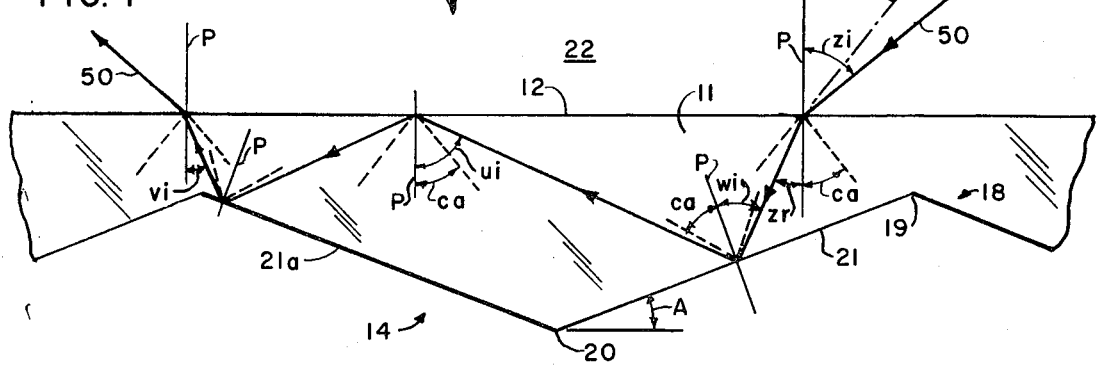
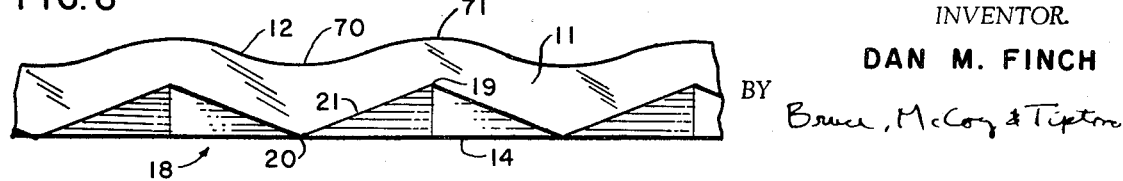
INVENTOR.
DAN M. FINCH
BY Bruce, McCoy & Tipton

3,671,101
LIGHT CONTROL MATERIAL
Dan M. Finch, Berkeley, Calif.
(200 Arlington Ave., Kensington, Calif. 94707)
Filed July 25, 1969, Ser. No. 845,005
Int. Cl. G02b 5/12
U.S. Cl. 350—109                                3 Claims

ABSTRACT OF THE DISCLOSURE

A sheet of light transmitting material is provided on its light exit side with a plurality of geometric surfaces, preferably right regular hexaginal pyramids, whose surfaces define an angle with the plane of said sheet sufficient to totally reflect all light rays entering the light entrance side at an angle of incidence exceeding a given angle and which have not passed through the sheet.

BACKGROUND OF THE INVENTION

This invention relates generally to light control materials, and in particular, to prismatic light control devices.

In the design of lighting fixtures or luminaires, it is highly desirable to provide a light transmitting diffuser that reduces the glare from the light source, concentrates or directs the light in a particular direction such as down onto a working surface, and does not absorb an excessive amount of the light passing through the diffuser material.

The light diffusers of the prior art were generally designed to reduce glare by frosting or etching the surface of the diffuser or incorporating a white pigment into the diffuser to scatter the light as it passes through, or by faceting or rippling the surface of the diffuser to scatter or direct the light by refraction. In some cases, both techniques are used.

The most common form of prior art faceted diffusers that directs or focuses the light rays passing therethrough is the Fresnel lense in which a plurality of surfaces defining progressively greater angles with the plane of the diffusers according to the distance away from the center of the lense are used to refract or focus the light.

The primary purpose of these prior art diffusers, whether they use a plurality of cones, curved surfaces of revolution, or faceted shapes on one or both surfaces of the diffuser, is to attempt to focus or refract the light without regard to loss of light by absorption through interflection within the diffuser.

SUMMARY OF THE INVENTION

The light control or diffuser material of the present invention not only refracts the light passing through it, but also reduces the loss of light from scattering at high angles of incidence within the diffuser material by totally reflecting that portion of the light entering the diffuser from the light entrance side beyond a particular angle of incidence, back into the light source cavity to add to the luminous flux available for reflection back through the diffuser material and down onto the working plane.

The light diffuser material of the present invention provides for the transmission of most of the light striking the light entrance side of the material up to a given angle of incidence and then totally reflecting most of the light striking the light entrance side at angles of incidence greater than the given angle.

In addition, the light diffuser material of the present invention may be made much thinner than the diffuser materials of the prior art, further increasing its efficiency by reducing light absorption losses.

It is, therefore, an object of the present invention to provide a light control material in which the loss of light through absorption in the material is low.

It is another object of this invention to provide a light control material in which the light that does not pass through the material is totally reflected back into the light source cavity.

It is still another object of this invention to provide a light control material that reduces the glare of the light source by reducing the transmitted light at high angles from the nadir.

It is a further object of this invention to provide a diffuser material having a high light transmission efficiency.

Other and more particular objects of this invention will be manifest upon study of the following detailed description when taken together with the accompanying drawings.

BRIEF DESCRIPTION OF THE DRAWINGS

FIG. 1 is a section taken at 1—1 through a typical sheet of diffuser or light control material;

FIG. 2 is a plan view of a typical sheet of light control material when viewed from the light exit side;

FIG. 3 is an enlarged section through a typical sheet of diffuser or light control material showing the path of light rays that pass through the material;

FIG. 4 is an enlarged section through a typical sheet of diffuser or light control material showing the path of a light ray that is totally reflected back into the light source cavity;

FIG. 5 is a candlepower or light intensity distribution curve showing the light control ability of the diffuser material when compared to a perfectly diffused or cosine distribution material; and FIG. 6 is a section through a second embodiment of the light control material in which the light entrance side is provided with a rippled surface.

DESCRIPTION OF THE PREFERRED EMBODIMENT

With reference to FIG. 1, the light control material of the present invention comprises, basically, a sheet of light transmitting material 11 having a ligh entrance side 12 and a light exit side 14. Light exit side 14 is provided with a plurality of geometric surfaces formed therein; in the present case; light regular hexaginal pyramids 18.

Other geometric surfaces may include right regular rectangular or triangular pyramids or right regular cones.

In the embodiment illustrated, point or apex 19 of each open pyramid 18 projects inwardly with the base edge or side 20 even with the surface of light exit side 14.

A typical light transmitting material 11 may be fabricated from either a translucent or clear sheet of plastic. The pyramids may be either cast or embossed in the plastic. The height $h$ of pyramid 18, for the preferred embodiment, is about 0.014 inch with a base width W measured across the base edge or side 20 of about 0.074 inch. The minimum thickness T of sheet 11 measured from apex 19 to light entrance side 12 is approximately 0.008 inch.

The angle A that geometric surface or facet 21 (the side extending from apex 19 to base edge 20 of pyramid 18) makes with the plane of sheet 11 is adjusted according to the index of refraction of the light control material 11 and the desired maximum angle of incidence before the light is totally reflected back into light source cavity 22. Typically, angle A can range from 20–30 degrees, but for the embodiment illustrated, angle A is about 22.3 degrees. For this value of angle A, the maximum angle of incidence is about 26–30 degrees depending upon the index of refraction of material 11. Light rays striking light entrance side 12 at angles of incidence greater than this will be totally reflected back into light source cavity 22.

The angle of incidence and refraction are measured, in all cases, from a line P perpendicular to the refracting surface.

Typical paths of light rays that pass through the light control material of the present invention are illustrated in FIG. 3.

In FIG. 3, two light rays 30 and 40 are shown, both entering light entrance side 12 at an angle of incidence $bi$ of 24 degrees. Both rays are refracted an equal amount upon entering material 11, having a density greater than air in accordance with Snell's law, namely:

$$N = \sin i / \sin r$$

where $N$ = index of refraction
$i$ = angle of incidence
$r$ = angle of refraction The angle of refraction $br$ is, for $N=1.5$ approximately 15.7 degrees.

For a light ray going into a less dense material, the reciprocal of the above equation is used.

Following light ray 30, it will strike or be incident upon facet 21 of pyramid 18 at an angle of incidence $xi$ with that surface of 38 degrees. Ray 30 will leave facet 21 at an angle of refraction $xr$ (into air) of 67.0 degrees or at an angle of 44.8 degrees with a perpendicular to the plane of material 11.

In a similar manner, with respect to light ray 40, its angle of refraction $br$, assuming $N=1.5$, will be the same as for ray 30, approximately 15.7 degrees.

Following light ray 40, however, it will strike facet 21a which slopes 22.3 degrees in the opposite direction to facet 21, at an angle of incidence $yi$ of about 4.8 degrees.

Again applying Snell's law for a light ray traveling from a higher to a lower density material, ray 40 will leave facet 21a at an angle of refraction $yr$ (into air) of about 7.2 degrees or at an angle of 15.1 degrees with a perpendicular to the plane of material 11.

It will be noted that in FIG. 3, light rays 30 and 40 have an angle of refraction less than the angle defined by dashed lines 31 and 41 respectively and 32 and 42 respectively.

The angle $ca$ that dashed lines 31, 32, 41 and 42 make with line P, the perpendicular to the respective surfaces, is the critical angle beyond which no refracted light is possible.

In accordance with Snell's law, the critical angle is defined as follows:

$$N = \frac{1}{\sin ca}$$

where:

$N$ = the index of refraction of the material
$ca$ = critical angle

For example, where $N=1.54$, the critical angle is about 40.5 degrees.

It is a well known principle of physics that a beam of light is totally reflected upon striking the interior surface of a refracting material at an angle of incidence greater than the critical angle $ca$, i.e. the light is reflected without absorption or loss of light by the reflecting surface.

With reference to FIG. 4, a light ray 50 is shown incident to upon the light entrance side 12 at an angle of incidence $zi$ of 50 degrees. It's angle of refraction $zr$ into material 11, on the basis of Snell's law for $N=1.5$, is about 30.7 degrees.

Ray 50 would strike facet 21 at an angle of incidence $wi$ of 22.3 plus 30.7 or 52.0 degrees which is greater than the critical angle $ca$ of 40.5 degrees assuming $N=1.5$.

Ray 50 would strike facet 21 at an angle of incidence $wi$ of 22.3 plus 30.7 or 52.0 degrees which is greater than the critical angle $ca$ of 40.5 degrees, assuming $N=1.5$.

Ray 50 will continue through material 11 and strike facet 21 at an angle of incidence $wi$ of 52.0 degrees. Since this angle of incidence is greater than the critical angle $ca$ (40.5 degrees assuming $N=1.5$), ray 50 will be totally reflected toward light entrance side 12 at an angle of reflection equal and opposite to the angle of incidence, striking the interior surface of side 12 at an angle of incidence $ui$ of 74.3 degrees. Since this angle is also greater than the critical angle $ca$, ray 50 will again be totally reflected to strike facet 21 at an angle of incidence of 52.0 degrees, and reflected to strike light entrance side 12 at an angle of 30.8 degrees, which is now less than critical angle $ca$ so that ray 50 will now be refracted both into light source cavity 22 at an angle of 50 degrees as it leaves light entrance side 12.

Thus, it can be seen that little light is absorbed through scattering within the light control material itself. Also, very little light is refracted or scattered into the glare zone, i.e. 60° to 90° from the nadir, i.e. from a line perpendicular to and extending underneath the diffuser material, but rather, that light which is not transmitted through material 11 is totally reflected back into light source cavity 22 where it can be interflected back through the light control material of the present invention and utilized.

In order to calculate the angle A necessary to totally reflect light rays striking light entrance side 12, an angle of incidence greater than the given angle B, the following equation may be used:

$$B = \arcsin [N(\sin (ca-A))]$$

where:

$A$ = angle that side 21 makes with the plane of material 11,
$B$ = maximum angle of incidence for a light ray striking light entrance side 12 before total reflection occurs,
$N$ = index of refraction of the light control material,
$ca$ = arc sin $1/N$ With reference to FIG. 5, there is shown a typical light intensity or candlepower distribution curve 60 for a perfect diffuser or cosine distribution light source compared with curve 61, the candlepower distribution curve for the light control material of the present invention.

The intensity in candlepower at any angle $p$ made by a lin 65 with the nadir or line 64 is proportional to the distance between the point of intersection of line 65 with the respective curve and point 62, the intersection of horizontal line 63 with the nadir 64.

For a typical luminaire using four eight-foot fluorescent lamps having a total light output of 24,200 lumens, the light intensity at various angles of $p$ are tabulated below for the light control material of the present invention and a material having a cosine distribution.

LUMINAIRE DISTRIBUTION DATA

| | Candlepower | |
| --- | --- | --- |
| $p$ | Light Control material | Cosine diffuser material |
| 0 | 6,260 | 6,000 |
| 15 | 6,150 | 5,796 |
| 35 | 5,410 | 4,915 |
| 55 | 2,950 | 3,441 |
| 75 | 918 | 1,553 |
| 85 | 279 | 523 |

It can be seen, therefore, that at greater angles of $p$, the brightness of the light control material of the present invention will be lower than for material that scatters the light in a perfectly diffused manner.

FIG. 6 illustrates another embodiment of the light control material of the present invention in which light entrance side 12 comprises a rippled surface in which valleys 70 are opposite base side 20 of pyramids 18 and rises are opposite the apex 19 of pyramids 18. In general, the valleys and rises are arranged to slope in the same direction as facets 21 and are disposed opposite them. The principle of operation, however, is the same in that the angle of facets or sides 21 are adjusted to tolally reflect light rays entering light entrance side 12 beyond a given angle of incidence.

It can also be seen that pyramids 18 can be inverted so that the apex of the pyramid can be at 20 and the base at 19, although for this configuration, sheet of material 11 will be substantially weaker than the material illustrated.

I claim:

1. A light control material comprising a sheet of light transmitting material having a light entrance side and a light exit side, said light exit side comprising a plurality of plane geometric surfaces, each of said surfaces defining an angle with the plane of said sheet according to the equation $B = \arc \sin[N(\sin(ca-A))]$ where A is the angle the geometric surface makes with the plane of said sheet and ranging between 20 and 30 degrees, N is the index of refraction of said material, B is the given angle beyond which the light not transmitted through said material is ottally reflected back through said light entrance side, ca is the critical angle for the material, said light entrance side comprises an undulating surface having valleys and rises, said valleys opposite the bases of said plane geometric surfaces and said rises opposite the inwardly pointing apexes of said plane geometric surfaces.

2. The light control material as claimed in claim 1 wherein sid light entrance side comprises a un undulating surface having valleys and rises, said valleys and rises sloping in the same direction and disposed opposite said geometric surfaces.

3. A light control material as claimed in claim 1 wherein said angle A is about 22.5 degrees.

References Cited

UNITED STATES PATENTS

| | | | |
|---|---|---|---|
| 285,270 | 9/1883 | Jaeger | 350—109 |
| 1,662,123 | 3/1928 | Myers | 350—109 |
| 2,480,031 | 8/1949 | Kellogg | 350—127 |
| 2,474,317 | 6/1949 | McPhail | 240—106 |
| 3,096,032 | 7/1963 | Davis | 240—106 |
| 3,234,376 | 2/1966 | Ceglia | 350—286 |
| 3,255,665 | 6/1966 | Weiher et al. | 350—262 |

FOREIGN PATENTS

| | | | |
|---|---|---|---|
| 792,681 | 7/1935 | France | 350—109 |
| 354,533 | 8/1931 | Great Britain | 350—103 |

DAVID SCHONBERG, Primary Examiner

M. J. TOKAR, Assistant Examiner

U.S. Cl. X.R.

240—93

UNITED STATES PATENT OFFICE
CERTIFICATE OF CORRECTION

Patent No. 3,671,101          Dated June 20, 1972

Inventor(s) Dan M. Finch

It is certified that error appears in the above-identified patent and that said Letters Patent are hereby corrected as shown below:

Column 2, line 41, "ligh" should read -- light --.
Column 5, line 22, "ottally" should read -- totally --.
Column 6, line 2, "sid" should read -- side --; "a un" should read -- an --.

Signed and sealed this 31st day of October 1972.

(SEAL)
Attest:

EDWARD M. FLETCHER, JR.
Attesting Officer

ROBERT GOTTSCHALK
Commissioner of Patents